(12) United States Patent
Ma et al.

(10) Patent No.: US 9,665,110 B2
(45) Date of Patent: May 30, 2017

(54) PARALLEL CURRENT-SHARING DEVICE AND CONTROL METHOD WITHOUT CURRENT-SHARING BUS

(71) Applicant: ITECH ELECTRONIC CO.,LTD, Jiangsu (CN)

(72) Inventors: Haibo Ma, Jiangsu (CN); Wei Xing, Jiangsu (CN)

(73) Assignee: ITECH ELECTRONICS CO., LTD., Jiangsu (CN)

( * ) Notice: Subject to any disclaimer, the term of this patent is extended or adjusted under 35 U.S.C. 154(b) by 0 days.

(21) Appl. No.: 15/100,314

(22) PCT Filed: Nov. 25, 2015

(86) PCT No.: PCT/CN2015/095550
§ 371 (c)(1),
(2) Date: May 29, 2016

(87) PCT Pub. No.: WO2016/112747
PCT Pub. Date: Jul. 21, 2016

(65) Prior Publication Data
US 2016/0357202 A1     Dec. 8, 2016

(30) Foreign Application Priority Data

Jan. 13, 2015 (CN) .......................... 2015 1 0015650

(51) Int. Cl.
*H02M 3/158* (2006.01)
*G05F 1/46* (2006.01)
(Continued)

(52) U.S. Cl.
CPC ................ *G05F 1/46* (2013.01); *H02M 3/04* (2013.01); *H02M 3/1584* (2013.01);
(Continued)

(58) Field of Classification Search
CPC .... H02M 3/156; H02M 3/158; H02M 3/1584; H02M 3/1588; H02M 2001/0003
See application file for complete search history.

(56) References Cited

U.S. PATENT DOCUMENTS 5,883,797 A * 3/1999 Amaro ..................... H02J 1/102
                                                       323/268
6,137,274 A * 10/2000 Rajagopalan ........... H02J 1/102
                                                       323/272

(Continued)

*Primary Examiner* — Gary L Laxton
(74) *Attorney, Agent, or Firm* — Jianq Chyun IP Office

(57) ABSTRACT

The present invention provides a parallel current-sharing device and control method without a current-sharing bus, for implementing parallel current sharing of direct-current outputs of a plurality of power conversion submodules. The parallel current-sharing device comprises a voltage control module and a plurality of power conversion submodules. The voltage control module and the plurality of power conversion submodules having parallel outputs form an outer voltage loop. The power conversion submodules comprise respective inner current loops and sample respective current feedback signals to generate inner current loop control signals, and the inner current loop control signals are superposed with an outer voltage loop control signal to control output of the power conversion submodules. An independent current bus is not required, and only one unidirectional outer control voltage loop is required. Functions the same as those of a conventional device are realized; the design, production and debugging of circuits of the parallel current-sharing device are simpler; a rapid multi-parallel dynamic response is realized; a ground wire loop current is eliminated, improving the anti-interference capability of the device; and multi-module parallel current sharing of a switching power supply or a linear power supply under analog control or digital control is realized very easily.

12 Claims, 2 Drawing Sheets

(51) Int. Cl.
*H02M 3/04* (2006.01)
*H02M 3/28* (2006.01)
*G05F 1/56* (2006.01)
*H02M 1/00* (2006.01)

(52) U.S. Cl.
CPC ............... *H02M 3/285* (2013.01); *G05F 1/56* (2013.01); *H02M 2001/0016* (2013.01); *H02M 2001/0025* (2013.01)

(56) References Cited

U.S. PATENT DOCUMENTS

| | | | |
|---|---|---|---|
| 6,278,263 B1* | 8/2001 | Walters ............... | H02M 3/1584 323/272 |
| 6,433,522 B1* | 8/2002 | Siri ........................... | G05F 1/67 320/101 |

* cited by examiner

US 9,665,110 B2

PARALLEL CURRENT-SHARING DEVICE AND CONTROL METHOD WITHOUT CURRENT-SHARING BUS

CROSS-REFERENCE TO RELATED APPLICATION

This application is a 371 application of an International PCT application serial no. PCT/CN2015/095550, filed on Nov. 25, 2015, which claims the priority benefit of China application serial no. 201510015650.8, filed on Jan. 13, 2015. The entirety of each of the above-mentioned patent applications is hereby incorporated by reference herein and made a part of this specification.

TECHNICAL FIELD

The present invention relates to a power supply control system, and more particularly to a multi-module parallel current-sharing device and control method without a current-sharing bus.

BACKGROUND ART

For parallel current-sharing control methods for a conventional high-power switching power supply, such as a master-slave method, a mean value method, and a maximum current method, a maximum current or a mean current is fed back through a current bus, and an error is formed between the maximum current or the mean current and a current in the current bus itself, to adjust a module voltage reference, thereby realizing current sharing, as shown in FIG. 1. In the current-sharing methods, multiple control loops need to be connected in series, so that the system response becomes slower, especially when multiple power supplies are connected in parallel.

In the conventional current-sharing methods, a current bus is required. A module current signal should be integrated into the bus and meanwhile, a bus signal can be transmitted to the modules, to perform amplification of an error between the bus signal and a module current feedback signal, that is to say, signal transmission in current bus is bidirectional. In a scene of serious electromagnetic interference, differential transmission is desired to obtain a high common mode rejection ratio, but two transmitter-receiver sets are required in the differential transmission to enable bidirectional signal transmission, thereby undoubtedly increasing the costs of implementing current sharing through a current bus and the complexity of design and production.

For the purpose of improving load regulation and precision of an output voltage, a voltage control module generally needs to be placed outside a parallel system, as shown in FIG. 2, to perform error amplification on a set reference and a feedback signal of parallel voltage output terminals to generate a total control signal, where the total control signal is unidirectional and can be transmitted to submodules through a differential device as a control reference. If the foregoing conventional current-sharing control method is adopted, two control buses are required in the system to implement remote voltage compensation and module current equalization, thereby undoubtedly increasing the complexity and fault rate of the system.

Generally, the module current signal is integrated into the current bus through a diode or resistor, a current bus signal is directly transmitted to an input end of a module error amplifier, and multiple common grounded points exist in the modules, which possibly generates a ground wire loop current, so that a current-sharing loop and even the system are interfered very easily and thus the stability of the system becomes poor.

For many control systems, the current-sharing control method is desired to be implemented through both an analog circuit and a digital circuit and applied in both a switching power supply and a linear power supply, so the current-sharing control method needs to be implemented very simply and thus have high flexibility. However, the conventional current-sharing method is relatively complex.

In the foregoing conventional current-sharing control method and device, because of a slow system response, multiple control buses are required, which is adverse to differential signal transmission, so that a loop current is easily generated, the anti-interference capability is poor, and the circuit design, production, assembly, and debugging are complex; and the method and the device cannot be flexibly applied to other types of control systems, thereby having a limited application range.

SUMMARY OF THE INVENTION

The objectives of the present invention are to provide a parallel current-sharing device and control method without a current-sharing bus, solving the following problems of the conventional parallel current-sharing device disposed with an independent current bus: a dual-loop circuit of an outer voltage loop and an inner voltage loop is complex, the multi-parallel dynamic response is slow, the anti-interference capability is poor because of a ground wire loop current, and the design, production, and debugging are complex.

In order to achieve the above objectives, the present invention provides a parallel current-sharing control method without a current-sharing bus, for implementing parallel current sharing of direct-current outputs of a plurality of power conversion submodules, wherein a voltage control module and a plurality of power conversion submodules are comprised, the voltage control module and the plurality of power conversion submodules having parallel outputs form an outer voltage loop, the voltage control module samples a terminal voltage signal output by the parallel power conversion submodules and outputs an outer voltage loop control signal to the power conversion submodules, and the power conversion submodules receive the outer voltage loop control signal; the power conversion submodules comprise respective inner current loops and sample respective current feedback signals to generate inner current loop control signals, and the inner current loop control signals are superposed with the outer voltage loop control signal to control output of the power conversion submodules.

The terminal voltage signal is compared with a set voltage reference to perform voltage error amplification to generate the outer voltage loop control signal; one part of the outer voltage loop control signal is used as a current error amplification reference of the present power conversion submodule for comparison with the current feedback signal output by the present power conversion submodule to perform current error amplification to generate an inner current loop control signal, the other part of the outer voltage loop control signal is superposed with the inner current loop control signal generated by the present power conversion submodule to generate a superposed control signal of the present power conversion submodule, and the superposed control signal passes through a driving part and a power conversion part of the present power conversion submodule in turn, to control output of the power conversion submodules to realize voltage stabilization and current sharing.

The terminal voltage signal and the outer voltage loop control signal are transmitted unidirectionally in a differential mode.

The bandwidth of the inner current loop is less than that of the outer voltage loop, and a control loop response speed of the inner current loop is different from that of the outer voltage loop.

The power conversion submodule is a switching power supply or a linear power supply, and signal transmission of the outer voltage loop and the inner current loop is controlled by an analog signal or a digital signal.

The present invention further provides a parallel current-sharing control device without a current-sharing bus, for implementing parallel current sharing of direct-current outputs of a plurality of power conversion submodules, comprising a voltage control module and a plurality of power conversion submodules, where the plurality of power conversion submodules is connected in parallel, the voltage control module and the plurality of power conversion submodules having parallel outputs form an outer voltage loop, the voltage control module samples a terminal voltage signal output by the plurality of parallel power conversion submodules and outputs an outer voltage loop control signal to the power conversion submodules, and the power conversion submodules receive the outer voltage loop control signal; each power conversion submodule comprises an inner current loop, the inner current loops are not connected by a current bus, the inner current loops sample current feedback signals individually output by the corresponding power conversion submodules respectively, to generate inner current loop control signals, and the inner current loop control signals are superposed with the outer voltage loop control signal to control output of the power conversion submodules.

The voltage control module comprises a first differential amplifier, a voltage error amplifier, and a differential driver, where the terminal voltage signal output by the plurality of parallel power conversion submodules is sampled and scaled by the first differential amplifier and then connected to a "−" input end of the voltage error amplifier, and a set voltage reference is connected to a "+" input end of the voltage error amplifier, to output an error amplified signal; the error amplified signal is differentially output by the differential driver to the power conversion submodules as the outer voltage loop control signal.

The inner current loop comprises a current amplifier, a current error amplifier, a second differential amplifier, and an adder, where the second differential amplifier samples and extracts the outer voltage loop control signal, one part of the outer voltage loop control signal is connected to a "+" input end of the current error amplifier as a reference, and the other part of the outer voltage loop control signal is connected to the adder; a current of the power conversion submodule is sampled and scaled by the current amplifier and then connected to a "−" input end, the current error amplifier outputs an error amplified signal, the error amplified signal is connected to the adder, and the adder adds the error amplified signal to the other part of the outer voltage loop control signal to output a superposed control signal to control the power conversion submodule.

The voltage control module samples, in a differential mode, the terminal voltage signal output by the plurality of parallel power conversion submodules and unidirectionally outputs the outer voltage loop control signal to the second differential amplifier in a differential mode.

In the present invention, an independent current bus and a voltage bus are synthesized into an outer voltage loop control bus, where the control bus is unidirectional and very suitable for differential transmission, so that the system has an excellent interference suppression capability; no inner voltage loop exists in the power conversion submodule, and the voltage control module directly controls the outputs of the power conversion submodules, so that dynamic response of the system is very rapid; the inner current loop in the power conversion submodule forces signals in positive and negative input pins to be equal, to indirectly adjust the output of the outer voltage loop, thereby enabling current sharing of the power conversion submodules; in practice, the bandwidth of the inner current loop may be narrow and the bandwidth of the outer voltage loop may be wide, so that the speed of the outer voltage loop contributes to the dynamic response and current sharing of the inner current loop is acquired in a stable state.

The beneficial effects of the present invention are as follows. An independent current bus is not required, and only one unidirectional outer control voltage loop is required. Functions the same as those of a conventional device are realized; the design, production and debugging of circuits of the parallel current-sharing device are simpler; a rapid multi-parallel dynamic response is realized; a ground wire loop current is eliminated, improving the anti-interference capability of the device; and multi-module parallel current sharing of a switching power supply or a linear power supply under analog control or digital control is realized very easily.

DETAILED DESCRIPTION OF THE INVENTION

Preferred embodiments of the present invention are described below in detail in combination with the accompanying drawings.

Figure 2:
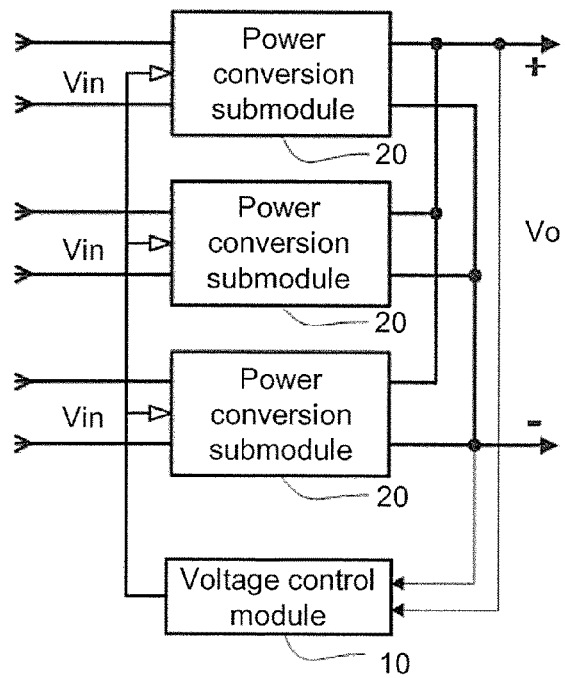
FIG. 2 is a connection block diagram for multi-module parallel current-sharing without an independent current bus according to an embodiment of the present invention.
Figure 3:
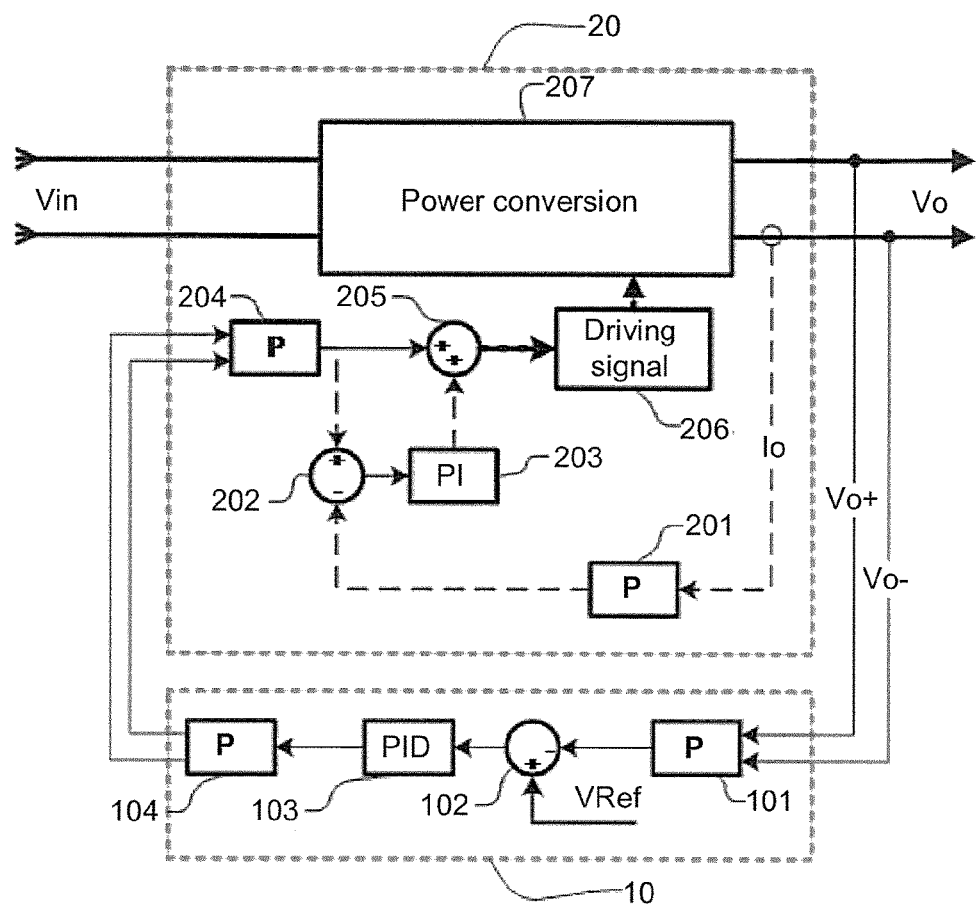
FIG. 3 is a control block diagram for single-module parallel current-sharing without an independent current bus according to an embodiment of the present invention.

Embodiment 1: as shown in FIG. 2 and FIG. 3, the present embodiment provides a parallel current-sharing control device without a current-sharing bus, comprising: a voltage control module 10 and three power conversion submodules 20. The voltage control module 10 comprises a first differential amplifier 101, a voltage error amplifier, and a differential driver 104. The voltage error amplifier comprises a voltage subtracter 102 and a PID regulator 103. A terminal voltage signal totally output by the three parallel power conversion submodules is sampled and scaled by the first differential amplifier 101 and then connected to a "−" input end of the voltage subtracter 102 of an outer voltage loop, and a set voltage reference is connected to a "+" input end of the voltage subtracter 102, obtaining an error signal. The error signal is amplified by the PID regulator 103, output by the differential driver 104, and connected the three power conversion submodules as an outer voltage loop control signal. Input and output of the outer voltage loop control signal are differential transmission, so that the outer voltage loop has a very high common mode rejection ratio, thereby effectively suppressing noise.

Each of the power conversion submodules 20 comprises a current amplifier 201, a current error amplifier, a second differential amplifier 204, an adder 205, a driving signal transformation module 206, and a power conversion module 207. The current error amplifier comprises a current subtracter 202 and a PI regulator 203. The second differential amplifier 204 samples and extracts the outer voltage loop control signal. One part of the outer voltage loop control signal is connected to a "+" input end of the current subtracter 202 as a reference of the current subtracter 202, and the other part of the outer voltage loop control signal is connected to the adder 205. An output current Io of the power conversion submodule 20 is scaled by the current amplifier 201 and then connected to a "−" input end of the current subtracter 202, obtaining an error signal. The error signal is amplified by the PI regulator 203, outputting an amplified signal. The amplified signal is connected to the adder 205 to be superposed with the outer voltage loop control signal, obtaining a superposed signal. The superposed signal is connected to the driving signal transformation module 206, outputting a driving signal, to drive the power conversion module 207 to perform output control.

The superposed signal is input into the driving signal transformation module 206 to generate the driving signal. The driving signal transformation module 206 performs selection according to the type of power supplies. For a switching power supply, a PWM driving signal is generated by a triangular wave comparison circuit; for a linear power supply, a linear control power switch device is scaled. The present embodiment is applicable to a switching power supply or linear power supply with parallel modules, realizing module current sharing.

The present embodiment further provides a parallel current-sharing control method without a current-sharing bus, for implementing parallel current sharing of direct-current outputs of a plurality of power conversion submodules. A voltage control module and three power conversion submodules are comprised. The voltage control module and the three power conversion submodules having parallel outputs form an outer voltage loop. The voltage control module samples a terminal voltage signal output by the parallel power conversion submodules and outputs an outer voltage loop control signal to the power conversion submodules. The power conversion submodules receive the outer voltage loop control signal.

The power conversion submodules comprise respective inner current loops and sample respective current feedback signals to generate inner current loop control signals, and the inner current loop control signals are superposed with the outer voltage loop control signal to control output of the power conversion submodules.

The terminal voltage signal is compared with a set voltage reference to perform voltage error amplification to generate the outer voltage loop control signal; one part of the outer voltage loop control signal is used as a current error amplification reference of the present power conversion submodule for comparison with the current feedback signal output by the present power conversion submodule to perform current error amplification to generate an inner current loop control signal, the other part of the outer voltage loop control signal is superposed with the inner current loop control signal generated by the present power conversion submodule to generate a superposed control signal of the present power conversion submodule, and the superposed control signal passes through a driving part and a power conversion part of the present power conversion submodule in turn, to control output of the power conversion submodules to realize voltage stabilization and current sharing.

The terminal voltage signal and the outer voltage loop control signal are transmitted unidirectionally in a differential mode.

The bandwidth of the inner current loop is less than that of the outer voltage loop, and a control loop response speed of the inner current loop is different from that of the outer voltage loop.

The working principle of the present embodiment is as follows. When one power conversion submodule has a high current and another power conversion submodule has a low current, since the same reference signal is used for the two power conversion submodules, the module having a high current has a small error signal and thus, a current loop thereof generates a small control quantity; on the contrary, the module having a low current has a large error signal and thus, a current loop thereof generates a large control quantity. At this time, it is assumed that the current reference signal is greater than current feedback signals of the two modules and an output voltage is already stable. Since the current errors are positive, current error outputs are positive and superposed with an outer voltage loop control quantity, so that the output voltage is increased. When it is detected in the outer voltage loop that the output voltage is increased, the control quantity is decreased continuously. When the outer voltage loop control quantity is equal to or slightly less than a feedback current of the module having a high current but greater than a feedback current of the module having a low current, the module having a high current begins to have a decreased control quantity and thus a decreased module current, and the module having a low current still has an increased current control quantity and thus an increased current. The outer loop output voltage feedback is still greater than the set voltage reference, the outer voltage loop control quantity is still decreased, the current of the module having a high current is still decreased, and the current of the module having a low current is gradually increased. When input signals of the current error amplifier of the module having a low current are equal, input signals of the current error amplifier of the module having a high current are also equal, thereby obtaining current sharing between modules. It is assumed that the current balance is destroyed in a certain condition. For example, an input voltage of one module is decreased suddenly, so that an output current of the module gets decreased and an output voltage is relatively decreased. In order to reach a set voltage, the outer voltage loop control quantity is increased. Since the outer voltage loop is faster, the output can be stabilized rapidly. An increased current loop reference signal means an increased current error of each module and thus an increased current control quantity. As described above, the outer voltage loop control quantity is decreased, the current control quantity of the module having a high current is decreased, and the current control quantity of the module having a low current is increased, until all current loop inputs are equal, thereby eventually restoring current sharing.

Signal transmission in a differential mode in the present embodiment has the following advantages. First, high resistance isolation of the input and output is realized, so that a ground wire loop current does not exist after the modules are connected in parallel, eliminating signal interference and unstable control caused by the loop current. Second, output voltage sampling may need to be performed at a far end to compensate for the output voltage loss caused by wire impedance, so a sampling signal wire is necessarily very long, so that the signal wire is influenced very easily; the differential sampling has an excellent common mode rejection capability, thereby effectively suppressing noise.

Figure 1:
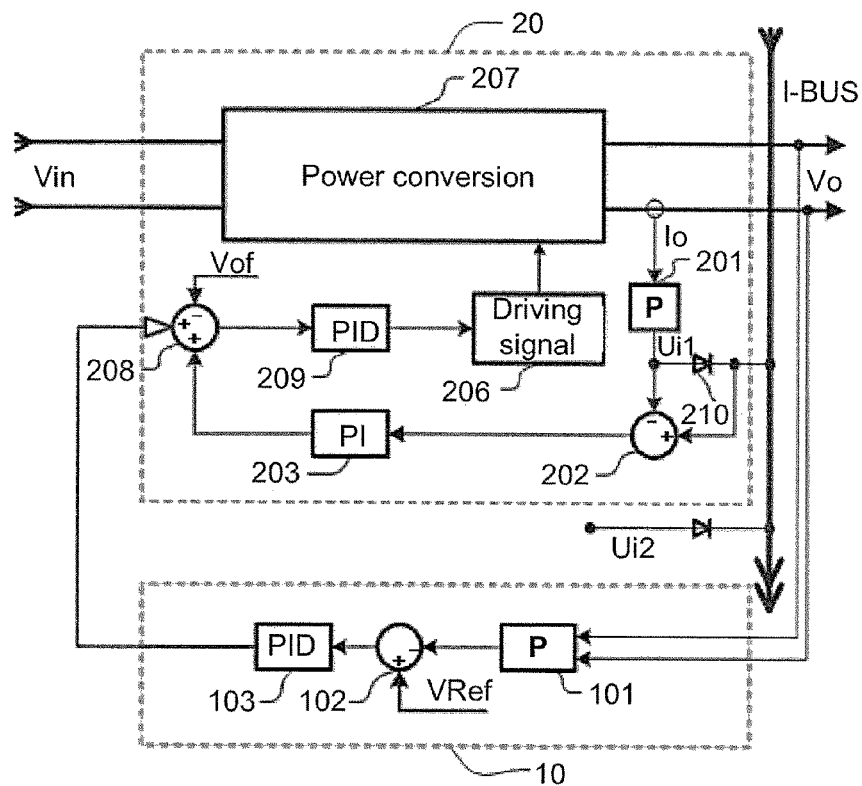
FIG. 1 is a control block diagram of a maximum current method requiring an independent current bus in the prior art.

For current-sharing control (for example, a maximum current method) in the prior art, as shown in FIG. 1, a current signal is scaled by a current amplifier 201. One part of the scaled signal is input into a "−" input end of a current error amplifier, and the other part of the scaled signal is integrated into a current bus through a diode 210. When a present module current Ui1 is greater than an I-Bus voltage, the diode 210 is turned on, and the module begins to control the current bus; when the present module current Ui1 is less than the I-Bus voltage, the diode 210 is not turned on, an output signal of the current error amplifier is positive and superposed to a "+" input end of a voltage error amplifier, where the voltage error amplifier comprises a subtracter 208 and a PID regulator 209. A reference signal is increased to increase the present module current. The current bus is bidirectional. The module can transfer a signal to the current bus and a current bus signal can be input into the module, so that it is relatively difficult for a conventional current-sharing control method requiring a current bus to perform differential signal transmission. However, in the present embodiment, only one voltage bus exists and is unidirectional, so that it is very convenient for the system to transmit signals in a differential mode, thereby improving the anti-interference capability of the system.

Embodiment 2: as shown in FIG. 3, in the present embodiment, one voltage control module and one power conversion submodule are comprised, and other technical solutions are similar to Embodiment 1.

The working principle of the present embodiment is as follows. When one module runs, it is assumed that, an output voltage is 0 and an output current is 0, and after the voltage control module sets a reference, since an error is very large at this time, a very large outer voltage loop control quantity is generated and transmitted to the power conversion submodule 20. Since an inner current loop is relatively slow and is not sensitive to a reference change. At this time, an outer voltage loop plays a main control role and prompts the output voltage to increase rapidly so that the output voltage is stabilized at a set voltage. The outer voltage loop control quantity is also used as an inner current loop reference. An inner current loop error is positive. A PI operation is performed on the inner current loop error to generate a positive control signal. The positive control signal is superposed on the outer voltage loop. For an already stable output voltage, an increased control quantity necessarily causes an increased output voltage. When it is detected in the outer voltage loop that the output voltage is greater than a set value, an outer voltage loop control quantity is decreased so that the output voltage is decreased, and a reference signal equivalently acting on the current loop is decreased. However, at this time, the current loop error is still positive, the output current is further increased, and the outer voltage loop control quantity is gradually decreased, so that the current loop error signal and control quantity are gradually decreased, and eventually, the outer voltage loop control quantity is equal to an inner current loop feedback current, that is, an outer voltage loop control signal is equal to a module current signal at a stable state. After the present balance is destroyed in a certain condition, for example, a suddenly decreased load, the current is decreased, and the voltage is relatively increased. The outer voltage loop control quantity is decreased rapidly, to decrease the output voltage. If the reference signal of the current error amplifier is still greater than a current feedback signal, the output of the current error amplifier is still increased. The current output is increased, so that the output voltage is still high, so the outer voltage loop control quantity has to be decreased again, until input signals of the current error amplifier are equal, reestablishing a balance.

The invention claimed is:

1. A parallel current-sharing control method without a current-sharing bus, for implementing parallel current sharing of direct-current outputs of a plurality of power conversion submodules, wherein a voltage control module and a plurality of power conversion submodules are comprised, characterized in that: the voltage control module and the plurality of power conversion submodules having parallel outputs form an outer voltage loop, the voltage control module samples a terminal voltage signal output by the parallel power conversion submodules and outputs an outer voltage loop control signal to the power conversion submodules, and the power conversion submodules receive the outer voltage loop control signal; the power conversion submodules comprise respective inner current loops and sample respective current feedback signals to generate inner current loop control signals, and the inner current loop control signals are superposed with the outer voltage loop control signal to control output of the power conversion submodules.

2. The parallel current-sharing control method without a current-sharing bus according to claim 1, characterized in that, the terminal voltage signal is compared with a set voltage reference to perform voltage error amplification to generate the outer voltage loop control signal; one part of the outer voltage loop control signal is used as a current error amplification reference of the present power conversion submodule for comparison with the current feedback signal output by the present power conversion submodule to perform current error amplification to generate an inner current loop control signal, the other part of the outer voltage loop control signal is superposed with the inner current loop control signal generated by the present power conversion submodule to generate a superposed control signal of the present power conversion submodule, the superposed control signal passes through a driving part and a power conversion part of the present power conversion submodule in turn, to control output of the power conversion submodules to realize voltage stabilization and current sharing.

3. The parallel current-sharing control method without a current-sharing bus according to claim 1, characterized in that, the terminal voltage signal and the outer voltage loop control signal are transmitted unidirectionally in a differential mode.

4. The parallel current-sharing control method without a current-sharing bus according to claim 3, characterized in that, the bandwidth of the inner current loop is less than that of the outer voltage loop, and a control loop response speed of the inner current loop is different from that of the outer voltage loop.

5. The parallel current-sharing control method without a current-sharing bus according to claim 1, characterized in that, the power conversion submodule is a switching power supply or a linear power supply, and signal transmission of the outer voltage loop and the inner current loop is controlled by an analog signal or a digital signal.

6. A parallel current-sharing control device without a current-sharing bus, for implementing parallel current sharing of direct-current outputs of a plurality of power conversion submodules, comprising a voltage control module and a plurality of power conversion submodules, and characterized in that: the plurality of power conversion submodules is connected in parallel, the voltage control module and the plurality of power conversion submodules having parallel outputs form an outer voltage loop, the voltage control module samples a terminal voltage signal output by the plurality of parallel power conversion submodules and outputs an outer voltage loop control signal to the power conversion submodules, and the power conversion submodules receive the outer voltage loop control signal; each power conversion submodule comprises an inner current loop, the inner current loops are not connected by a current bus, the inner current loops sample current feedback signals individually output by the corresponding power conversion submodules respectively, to generate inner current loop control signals, and the inner current loop control signals are superposed with the outer voltage loop control signal to control output of the power conversion submodules.

7. The parallel current-sharing control device without a current-sharing bus according to claim 6, characterized in that, the voltage control module comprises a first differential amplifier, a voltage error amplifier, and a differential driver, wherein the terminal voltage signal output by the plurality of parallel power conversion submodules is sampled and scaled by the first differential amplifier and then connected to a "−" input end of the voltage error amplifier, and a set voltage reference is connected to a "+" input end of the voltage error amplifier, to output an error amplified signal; the error amplified signal is differentially output by the differential driver to the power conversion submodules as the outer voltage loop control signal.

8. The parallel current-sharing control device without a current-sharing bus according to claim 6, characterized in that, the inner current loop comprises a current amplifier, a current error amplifier, a second differential amplifier, and an adder, wherein the second differential amplifier samples and extracts the outer voltage loop control signal, one part of the outer voltage loop control signal is connected to a "+" input end of the current error amplifier as a reference, and the other part of the outer voltage loop control signal is connected to the adder; a current of the power conversion submodule is sampled and scaled by the current amplifier and then connected to a "−" input end, the current error amplifier outputs an error amplified signal, the error amplified signal is connected to the adder, and the adder adds the error amplified signal to the other part of the outer voltage loop control signal to output a superposed control signal to control the power conversion submodule.

9. The parallel current-sharing control device without a current-sharing bus according to claim 6, characterized in that, the voltage control module samples, in a differential mode, the terminal voltage signal output by the plurality of parallel power conversion submodules and unidirectionally outputs the outer voltage loop control signal to the second differential amplifier in a differential mode.

10. The parallel current-sharing control method without a current-sharing bus according to claim 2, characterized in that, the terminal voltage signal and the outer voltage loop control signal are transmitted unidirectionally in a differential mode.

11. The parallel current-sharing control method without a current-sharing bus according to claim 10, characterized in that, the bandwidth of the inner current loop is less than that of the outer voltage loop, and a control loop response speed of the inner current loop is different from that of the outer voltage loop.

12. The parallel current-sharing control device without a current-sharing bus according to claim 7, characterized in that, the inner current loop comprises a current amplifier, a current error amplifier, a second differential amplifier, and an adder, wherein the second differential amplifier samples and extracts the outer voltage loop control signal, one part of the outer voltage loop control signal is connected to a "+" input end of the current error amplifier as a reference, and the other part of the outer voltage loop control signal is connected to the adder; a current of the power conversion submodule is sampled and scaled by the current amplifier and then connected to a "−" input end, the current error amplifier outputs an error amplified signal, the error amplified signal is connected to the adder, and the adder adds the error amplified signal to the other part of the outer voltage loop control signal to output a superposed control signal to control the power conversion submodule.

* * * * *